United States Patent Office 3,489,577
Patented Jan. 13, 1970

3,489,577
THERMALLY CRYSTALLIZABLE GLASSES AND GLASS-CERAMIC PRODUCTS
Megumi Tashiro, Kyoto, Masamichi Wada and Fumitaka Toya, Otsu, and Fumio Yamaguchi, Kusatsu, Japan, assignors to Nippon Electric Glass Company, Ltd., Otsu, Shiga, Japan, a corporation of Japan
No Drawing. Filed June 27, 1967, Ser. No. 649,115
Int. Cl. C03c 3/22; C04b 35/14, 35/00
U.S. Cl. 106—39
2 Claims

ABSTRACT OF THE DISCLOSURE

The following specification discloses new thermally crystallizable glasses consisting essentially of 55–73 weight percent silica, 15–35% alumina, 2–6% lithia, 0.5–2% titania, 1–4% zirconia and 0.5–4% fluorine as main components, and also semicrystalline ceramic bodies, known generally in the art as glass-ceramics, made by thermal crystallization of said glasses and having high mechanical strength.

---

This invention relates to thermally crystallizable glasses and to semicrystalline ceramic bodies, known generally in the art as glass-ceramics, made by thermal crystallization of such glasses to yield high strength glass-ceramics having low coefficients of thermal expansion. Essential ingredients in such glasses are $SiO_2$, $Al_2O_3$, $Li_2O$, and fluorine, as well as nucleating agents, $TiO_2$ and $ZrO_2$.

As is generally known, low expansion crystallizable materials having a linear thermal expansion coefficient of less than $20 \times 10^{-7}/°C$. are produced by methods described in Japanese patent publication SHO 36–15172, SHO 39–7914 and SHO 40–20182, etc.

obtain low expansion crystallizable materials. However, it is very difficult to produce low expansion crystallizable materials with high mechanical strength by these above known methods. (P. W. McMillan, Glass-Ceramics, p. 135, Academic Press, London, 1964.)

The present inventors have discovered that semicrystalline ceramic bodies or glass-ceramics having a low coefficient of thermal expansion of less than $20 \times 10^{-7}$ per ° C. over the range 30 to 380° C., which are made by thermal in situ crystallization of certain glasses containing in weight percent 55–73 $SiO_2$, 15–35 $Al_2O_3$, 2–6 $Li_2O$, 0.5–2 $TiO_2$, 1–4 $ZrO_2$ and 0–5 $P_2O_5$, can be dramatically increased in mechanical or bending strength by inclusion in the glasses of substantial amounts of fluorine in the range from 0.5 to 4 weight percent.

More specifically, the glasses and the resulting glass-ceramics of the present invention which are made by thermal crystallization of such glasses consist essentially of 55–73 $SiO_2$, 15–35 $Al_2O_3$, 2–6 $Li_2O$, 0.5–2 $TiO_2$, 1–4 $ZrO_2$, 0–5 $P_2O_5$ and 0.5–4 F wherein at least 90 weight percent of the glass composition is made up of these named components.

The inclusion of substantial amounts of fluorine in the glass and glass-ceramic compositions increases the bending strength of the glass-ceramics made from the glasses of the invention on the order of 1.5 to 5 times. Table I shows examples of the compositions of glasses and the resulting glass-ceramics of the invention made by heat treating the glasses, together with a control composition containing no fluorine. The table also shows the bending strength of each glass-ceramic and is average linear coefficient of thermal expansion per $°C. \times 10^{+7}$, over the range 30 to 380° C.

The main object of the above publicized method is to

TABLE I.—PARTS BY WEIGHT

| Component | 1 | 2 | 3 | 4 | 5 | 6 | 7 | 8 | 9 |
|---|---|---|---|---|---|---|---|---|---|
| $SiO_2$ | 58.0 | 58.0 | 58.0 | 58.0 | 58.0 | 65.1 | 65.1 | 60.7 | 60.1 |
| $Al_2O_3$ | 27.8 | 27.8 | 27.8 | 27.8 | 27.8 | 22.7 | 22.7 | 29.0 | 25.9 |
| $Li_2O$ | 4.4 | 4.4 | 4.4 | 4.4 | 4.4 | 4.2 | 4.2 | 4.6 | 4.1 |
| MgO | | | | | | 0.9 | 0.9 | | 0.9 |
| $P_2O_5$ | 3.6 | 3.6 | 3.6 | 3.6 | 3.6 | | 2.2 | | 3.6 |
| $ZrO_2$ | 2.6 | 2.6 | 2.6 | 2.6 | 2.6 | 1.9 | 1.9 | 2.5 | 2.6 |
| $TiO_2$ | 1.9 | 1.9 | 1.9 | 1.9 | 1.9 | 1.8 | 1.8 | 1.9 | 1.8 |
| $Na_2O$ | 0.6 | 0.6 | 0.6 | 0.6 | 0.6 | 0.6 | 0.6 | 0.6 | 0.5 |
| $K_2O$ | 0.6 | 0.6 | 0.6 | 0.6 | 0.6 | 0.6 | 0.6 | 0.6 | 0.5 |
| PbO | 0.6 | 0.6 | 0.6 | 0.6 | 0.6 | | | | |
| F | 0 | 0.4 | 1.0 | 2.0 | 3.0 | 1.6 | 1.4 | 1.7 | 1.5 |
| Bending strength of glass-ceramic (kg./cm.²) | 1,050 | 1,790 | 3,450 | 4,800 | 5,900 | 4,310 | 5,020 | 5,100 | 4,860 |
| Thermal expansion coefficient of glass-ceramic $\times 10^{+7}$ ° C | 11.9 | 11.5 | 11.4 | 11.4 | 11.6 | 10.1 | 9.2 | 11.9 | 11.9 |

TABLE II.—PARTS BY WEIGHT

| Component | 10 | 11 | 12 | 13 | 14 | 15 | 16 | 17 | 18 |
|---|---|---|---|---|---|---|---|---|---|
| $SiO_2$ | 61.9 | 58.2 | 72.4 | 70.8 | 69.4 | 68.9 | 69 | 71 | 70.3 |
| $Al_2O_3$ | 25.5 | 27.5 | 20.1 | 20.5 | 19.8 | 19.7 | 19.8 | 16.6 | 18 |
| $Li_2O$ | 4.5 | 4.4 | 3.6 | 3.6 | 4.6 | 4.6 | 4.6 | 3.4 | 4.5 |
| $TiO_2$ | 1.9 | 2 | 1.9 | 1.9 | 1.8 | 1.8 | 1.9 | 1.8 | 1.8 |
| $ZrO_2$ | 2.8 | 2.5 | 1.6 | 1.6 | 1.5 | 1.5 | 1.5 | 1.2 | 3 |
| MgO | | | | | 2 | 2 | 2 | 3.9 | 1 |
| $Na_2O$ | 0.6 | 0.7 | 0.5 | 0.5 | 0.6 | 0.6 | 0.5 | 0.5 | 0.5 |
| $K_2O$ | 0.5 | 0.5 | 0.2 | 0.1 | 0.3 | 0.3 | 0.2 | 0.1 | 0.3 |
| $P_2O_5$ | 1.8 | 3.3 | | | | | | | |
| $Sb_2O_5$ | | | | | | | | 0.4 | |
| PbO | | 0.5 | | | | | | | |
| F | 0.5 | 0.9 | 0.0 | 1 | 0.0 | 0.7 | 1.4 | 1.1 | 0.6 |
| Heat treatment ° F., hours | 1,350–2<br>2,200–1 | 1,360–1<br>2,190–2 | 1,400–2<br>2,200–1 | 1,400–2<br>2,200–1 | 1,300–2<br>2,000–1 | 1,300–2<br>2,000–2 | 1,300–2<br>2,000–1 | 1,300–2<br>1,600–1<br>2,100–1 | 1,400–4<br>2,100–1 |
| Bending strength of glass-ceramic (kg./cm.²) | 4,030 | 5,580 | 1,260 | 4,260 | 1,360 | 2,100 | 3,060 | 2,670 | 3,160 |
| Thermal expansion coefficient of glass-ceramic $\times 10^{+7}$ (30–380° C.) | *10.9 | *14.1 | *6 | 2.9 | 8.1 | 6.6 | 5.6 | *12.7 | 2.8 |

*Determined for 0–300° C.

It will be seen that the fluorine in the composition 2 increased the strength of composition 1 by about 70 percent but that the increased amounts of fluorine in compositions of the invention 3 to 5 very dramatically increase the strengths of composition 1. It will be noted that all of the compositions 1 through 5 are the same except for the increasing amounts of added fluorine. In somewhat different composition areas, it will be noted that compositions 6, 7, 8 and 9 of the invention are also extremely strong. All of the strong glass-ceramics have a low coefficient of thermal expansion, as will be seen.

In Table II, also, direct comparisons can be made with strengths of the crystallized glass-ceramics containing fluorine and those not containing fluorine. For instance, composition 13 is substantially the same as composition 12 which contains no fluorine. It will be seen that the bending strength of composition 13, containing 1 percent fluorine, is well over three times that of composition 12. Similarly, it will be seen that compositions 14, 15 and 16 are all essentially the same compositions except that they contain, respectively, zero, 0.7 and 1.4 parts by weight of fluorine. Thus, in the composition area of No. 14 the addition of increasing amounts of fluorine (compositions 15 and 16) greatly increases the strength. Compositions 10, 11, 17 and 18 of the invention further illustrate the high strength, low thermal expansion glass-ceramics of the invention made from the glasses of the compositions listed. The bending strengths were obtained on abraded rods.

The compositions of Tables I and II were made into glasses by melting normal glass-making bath ingredients in platinum crucibles, with stirring in an electric furnace for eight hours at about 1550° C., and the molten glasses were fomed into rods of about 5 millimeters in diameter, being cut into pieces of 50 millimeters in length for the bending strength tests (modulus of rupture). Glass rods of Examples 1 through 8 were thermally crystallized by heating continuously in an electric furnace at a heating rate of about 5° C. per minute to the temperature range 750–850° C., where they were held for about two hours, and then they were heated continuously up to a temperature of 1100° C. at a heating rate of about 5° C. per minute and kept for 1 hour at this temperature. In each instance all of the glasses 1 through 18 were thermally in situ crystallized to glass-ceramics having the properties set out in Tables I and II. All of the glass-ceramics of the tables had linear coefficients of expansion of less than $20 \times 10^{-7}$ per ° C. over the range 30–380° C.

The glass rods of the compositions 10 through 18 listed in Table II were crystallized similarly to those listed in Table I, except that the temperatures of holding and the hours of holding at those temperatures are as given in Table II. The first holding temperature, for instance, for composition 11 was one hour at 1360° F. followed by 2 hours at 2190° F. after heating up at a rate of about 5° C. per minute (9° F.). Thus, Table II shows the holding temperature and time of heat treatment to obtain the thermally crystallizable glasses having the bending strength and coefficients of thermal expansion shown in Table II. It will be noted that there were three holding temperatures in the heat treatment shown for composition 17.

As before noted, normal glass-making ingredients can be employed in the melting of the glasses of the present invention. The actual batch ingredients and their amounts employed in the melting (already described) of the glass of composition No. 11 are as follows:

| Batch ingredient: | Parts by weight |
|---|---|
| Aluminum fluoride | 213.8 |
| Lithium carbonate | 536.2 |
| Ottawa flint | 2756.5 |
| Aluminum hydroxide | 1821.2 |
| Florida zircon | 189.4 |
| Titanium dioxide | 95.6 |
| Aluminum metaphosphate | 221.1 |
| Red lead oxide ($Pb_3O_4$) | 30.6 |
| Sodium nitrate | 68.6 |
| Potassium nitrate | 53.7 |

The aluminum fluoride, lithium carbonate, Ottawa flint (silicon dioxide), aluminum hydroxide, aluminum metaphosphate, red lead oxide ($Pb_3O_4$), sodium nitrate and potassium nitrate were all essentially pure chemical components. The Florida zircon was 63.4 parts by weight $SiO_2$ and 125.0 parts by weight $ZrO_2$. The titanium dioxide was 99.4 weight percent $TiO_2$ and 0.1 CaO plus trace ingredients and a small ignition loss. The melting of the foregoing batch materials in the manner already described produce the glass of the composition of Example 11 in Table II which was converted to the glass-ceramic of the invention by the heat treatment of Table II to give a glass-ceramic of the properties listed in Table II.

The reasons for the limitations on the amounts of the materials which we term crystallization promoters or nucleating agents, namely $TiO_2$ and $ZrO_2$, is that an insufficient amount of $TiO_2$ or of $TiO_2$ and $ZrO_2$ makes it impossible or extremely difficult to convert the glasses to a semicrystalline ceramic body of high strength, presumably because of insufficient nucleation or insufficient formation of microcrystals (crystallization centers) on heating. If $ZrO_2$, on the other hand, is too high, it becomes very difficult as a practical matter to form molded glass articles from the glasses because the liquidus temperature of the glass becomes very high. If the $TiO_2$ is too high, it also becomes difficult to form the solid glass from the melt without breaking the molded article, presumably because of the non-uniform formation of crystals of low expansion in the glass during gradual cooling. The combination of 0.5–2 percent $TiO_2$ plus 1 to 4 percent $ZrO_2$ gives good glasses and glass-ceramics, both from the standpoint of formation properties of the glass and from the standpoint of the crystallization properties in making the glass-ceramic on heating of the glass.

If $SiO_2$ is substantially less than 55 percent, the chemical resistance of the glass-ceramic is decreased, while substantially more $SiO_2$ than 73 percent yields glasses with poor working properties. Therefore, $SiO_2$ is limited to 55–73 percent. If $Al_2O_3$ is less than 15 percent, the liquidus temperature of the glass increases, and when $Al_2O_3$ is more than 35 percent the forming or fusing of the glass becomes very difficult. When $Li_2O$ is less than 2 percent, it is impossible or difficult to produce by thermal crystallization a glass-ceramic having a coefficient of expansion of less than $20 \times 10^{-7}$/° C. The F content of the glasses and glass-ceramics is 0.5 to 4 weight percent because lower values do not give the very dramatic strength increases and at more than 4 percent it is very difficult to produce a uniform glass melt or glass and, consequently a uniform glass-ceramic, because of the high volatility of fluorine and its consequent escape from the surface of the glass during fusion.

Other compatible glass-making ingredients can be employed in the present glasses and glass-ceramics so long as they do not change the essential and novel characteristics thereof. The glasses or glass melts must be capable of being formed into the glass object and must be thermally crystallizable to high strength glass-ceramic products by the addition of fluorine according to the invention. Ingredients that can be included, for instance, include up to 3 percent each of ingredients such as $Na_2O$, $K_2O$, PbO, ZnO, BaO, SrO, CaO, MgO which can often be present without sacrifice of the basic characteristics of the glasses and glass-ceramics of this invention. Discretion must be exercised, and crystallization of many of the glasses may be difficult with as much as 3 percent $Na_2O$, for instance. Moreover, addition of too many extraneous ingredients can sometimes make it impossible to produce a glass-ceramic of the desired low expansion characteristics of the invention. In any event, the advantages of the glasses and glass-ceramics of the present invention, including the essential inclusion of fluorine are best obtained when the essential ingredients including the optional $P_2O_5$, are at least 90 weight percent of the glass or glass-ceramic composition as previously discussed.

According to the present invention the glass-ceramic products produced are useful for home cooking vessels for the top of the stove and for ovens, as well as for industrial materials for which high mechanical strength and low thermal expansion materials are desirable.

We claim:

1. A thermally crystallizable glass consisting essentially of the following as essential ingredients, expressed in weight percent of the total glass composition: 55–73 $SiO_2$, 15–35 $Al_2O_3$, 2–6 $Li_2O$, 0.5–2 $TiO_2$, 1–4 $ZrO_2$, 0.5–4 F and optionally containing 0–5 $P_2O_5$, wherein at least 90 weight percent of the glass composition is made up of the named components.

2. Strong semicrystalline ceramic bodies having a linear coefficient of thermal expansion per ° C. over the range 30–380° C. of less than $20 \times 10^{-7}$ and resulting from the thermal crystallization of a glass composition of claim 1.

References Cited

UNITED STATES PATENTS

| | | | |
|---|---|---|---|
| 3,282,712 | 11/1966 | Tashiro et al. | 106—39 |
| 3,148,994 | 9/1964 | Voss | 106—39 |
| 3,380,818 | 4/1968 | Smith | 106—39 |

FOREIGN PATENTS

| | | |
|---|---|---|
| 1,300,614 | 6/1962 | France. |
| 38/3912 | 4/1963 | Japan. |
| 38/10722 | 6/1963 | Japan. |
| 146,929 | 1/1965 | U.S.S.R. |

HELEN M. McCARTHY, Primary Examiner

U.S. Cl. X.R.

65—33; 106—52

UNITED STATES PATENT OFFICE
CERTIFICATE OF CORRECTION

Patent No. 3,489,577　　　　　　　　　　　　January 13, 1970

Megumi Tashiro et al.

It is certified that error appears in the above identified patent and that said Letters Patent are hereby corrected as shown below:

In the heading to the printed specification, lines 6 to 8, "assignors to Nippon Electric Glass Company, Ltd., Otsu, Shiga, Japan, a corporation of Japan" should read -- assignors, by mesne assignments, to Owens-Illinois, Inc., a corporation of Ohio --.

Signed and sealed this 26th day of May 1970.

(SEAL)
Attest:

Edward M. Fletcher, Jr.　　　　　　　　WILLIAM E. SCHUYLER, JR.
Attesting Officer　　　　　　　　　　　　　Commissioner of Patents